US009602313B1

(12) United States Patent
Jalloul

(10) Patent No.: US 9,602,313 B1
(45) Date of Patent: Mar. 21, 2017

(54) TIME-CONTROLLED SPATIAL INTERFERENCE REJECTION

(71) Applicant: QUALCOMM Incorporated, San Diego, CA (US)

(72) Inventor: Louay Jalloul, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/842,659

(22) Filed: Sep. 1, 2015

(51) Int. Cl.
*H04L 25/02* (2006.01)
*H04W 24/08* (2009.01)
*H04B 1/10* (2006.01)
*H04B 15/00* (2006.01)
*H04W 84/12* (2009.01)

(52) U.S. Cl.
CPC .............. *H04L 25/021* (2013.01); *H04B 1/10* (2013.01); *H04B 15/00* (2013.01); *H04W 24/08* (2013.01); *H04W 84/12* (2013.01)

(58) Field of Classification Search
CPC ......... H04B 15/00; H04B 1/10; H04L 25/021; H04W 24/08; H04W 84/12
See application file for complete search history.

(56) References Cited

U.S. PATENT DOCUMENTS

| 6,128,355 | A * | 10/2000 | Backman ............. H04B 7/0845 375/347 |
|---|---|---|---|
| 7,636,345 | B2 | 12/2009 | Eyal et al. |
| 8,300,609 | B2 | 10/2012 | Thoukydides et al. |
| 8,380,154 | B2 | 2/2013 | Lindqvist et al. |
| 8,699,448 | B2 * | 4/2014 | Lindqvist ............. H04J 11/0046 370/330 |
| 8,755,477 | B1 * | 6/2014 | Park ..................... H04B 7/0871 375/260 |
| 8,755,747 | B2 | 6/2014 | Robinson et al. |
| 8,798,654 | B2 | 8/2014 | Roessel et al. |
| 9,160,389 | B2 * | 10/2015 | Guo ..................... H04B 7/0857 |
| 2001/0031022 | A1 | 10/2001 | Petrus et al. |
| 2007/0242784 | A1 | 10/2007 | Sampson et al. |
| 2008/0293368 | A1 | 11/2008 | Desai et al. |
| 2009/0086837 | A1 * | 4/2009 | Teng .................. H04L 27/2647 375/260 |

(Continued)

FOREIGN PATENT DOCUMENTS

| WO | WO-2011053887 A1 | 5/2011 |
| WO | WO 2012068863 A1 | 5/2012 |
| WO | WO-2015105813 A2 | 7/2015 |

OTHER PUBLICATIONS

QUALCOMM AR9392: "Single-Chip, 2.4/5 GHz, 2-Stream 802.11a/b/g/n Solution with SST Technology for Enterprise WLAN," 2013, 3 Pages.

(Continued)

*Primary Examiner* — Kenneth Lam
(74) *Attorney, Agent, or Firm* — Holland & Hart LLP

(57) ABSTRACT

A dual-modem device opportunistically switches between spatial filtering techniques to enhance the received symbol estimates based at least in part on identifying, at a first modem, an interfering communication from a second modem. A WLAN modem can determine the timing of a WWAN transmission from a coexisting WWAN modem that interferes with a WLAN transmission and toggle between MRC and IRC receive techniques based at least in part on the determined timing.

21 Claims, 11 Drawing Sheets

(56) References Cited

U.S. PATENT DOCUMENTS

| | | | |
|---|---|---|---|
| 2010/0304770 A1 | 12/2010 | Wietfeldt et al. | |
| 2012/0115520 A1* | 5/2012 | Rossel | H04L 1/20 455/501 |
| 2012/0314598 A1 | 12/2012 | Sadek et al. | |
| 2012/0329395 A1 | 12/2012 | Husted et al. | |
| 2014/0269650 A1 | 9/2014 | Sahota | |
| 2014/0349584 A1 | 11/2014 | Clevorn et al. | |
| 2015/0003337 A1* | 1/2015 | Reial | H04L 1/0003 370/329 |
| 2015/0005029 A1 | 1/2015 | Medapalli et al. | |
| 2015/0023202 A1 | 1/2015 | Shattil | |
| 2015/0036656 A1 | 2/2015 | McCarthy et al. | |
| 2015/0065157 A1 | 3/2015 | HomChaudhuri et al. | |
| 2015/0092573 A1* | 4/2015 | Zhang | H04W 24/10 370/252 |
| 2015/0124632 A1* | 5/2015 | Sandberg | H04B 7/0854 370/252 |
| 2016/0087815 A1* | 3/2016 | Balachandran | H04B 1/10 375/346 |

OTHER PUBLICATIONS

ISA/EP, International Search Report and Written Opinion of the International Searching Authority, Int'l Application No. PCT/US2016/039639, Sep. 26, 2016, European Patent Office, Rijswijk, NL, 11 pgs.

* cited by examiner

TIME-CONTROLLED SPATIAL INTERFERENCE REJECTION

BACKGROUND

Field of the Disclosure

The following relates generally to wireless communication, and more specifically to techniques for time-controlled spatial interference rejection at a wireless local area network (WLAN) receiver.

Description of Related Art

Wireless communications systems are widely deployed to provide various types of communication content such as voice, video, packet data, messaging, broadcast, and so on. These systems are often multiple-access systems capable of supporting communication with multiple users by sharing the available system resources (e.g., time, frequency, and power). WLANs are an example of such systems and are widely deployed and used. Other examples of such multiple-access systems include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, includes one or more access points (APs). The AP simultaneously supports communications for multiple mobile devices or stations (STAs) over a shared radio frequency spectrum. A WLAN can operate in the presence of a wireless wide area network (WWAN) network, such as an LTE/LTE-A network. The WWAN network includes one or more base stations that support communication from multiple mobile devices or UEs. WWAN communications occur over dedicated radio frequency spectrum, shared radio frequency spectrum, or a combination of the two. Some STAs are equipped with both a WLAN modem and a WWAN modem to support both WLAN and WWAN communications. In some examples, transmissions to/from one modem (e.g., the WWAN modem) interfere with reception at the other modem (e.g., the WLAN modem).

STAs are equipped with interference mitigation techniques, such as time-domain and frequency domain filtering (e.g., spatial filtering). Certain spatial filtering techniques achieve enhanced performance based at least in part on the type of interference seen at a receiver.

SUMMARY

A multi-mode device opportunistically switches between spatial filtering techniques to enhance the received symbol estimates based at least in part on identifying, at a first modem, timing information about an interfering communication from a second modem. For example, a WLAN modem determines the timing of a WWAN transmission from a coexisting WWAN modem that interferes with a WLAN transmission. The WLAN modem toggles between maximal ratio combining (MRC) and interference rejection cancellation (IRC) receive techniques based at least in part on the determined timing. Thus, the WLAN modem receives a signal from the WWAN modem indicating the WWAN transmission timing. Accordingly, the WLAN modem determines that an interfering transmission is occurring and toggles the receiver mode to use IRC for subsequent reception. The WLAN modem generates IRC weights based at least in part on a computed interference covariance and a channel estimate that is computed during a training symbol field of a received WLAN frame.

A method of wireless communication is described. The method includes coexisting first and second modes, a transmission timing identifier to determine a timing of an interfering transmission by the first modem according to a first radio access technology (RAT), and a filter selector to toggle a use of interference rejection combining (IRC) during receive operations of the second modem according to a second RAT, wherein toggling is based at least in part on the determined timing of the interfering transmission.

A communications device is described. The communications device includes means for determining a timing of an interfering transmission by the first modem according to a first radio access technology (RAT), and means for toggling a use of interference rejection combining (IRC) during receive operations of the second modem according to a second RAT, wherein toggling is based at least in part on the determined timing of the interfering transmission.

Another communications device is described. The communications device may include a processor, memory in electronic communication with the processor, and instructions stored in the memory and operable, when executed by the processor, to cause the apparatus to determine a timing of an interfering transmission by the first modem according to a first radio access technology (RAT), and toggle a use of interference rejection combining (IRC) during receive operations of the second modem according to a second RAT, wherein toggling is based at least in part on the determined timing of the interfering transmission.

A non-transitory computer-readable medium comprising coexisting first and second modems and storing code for wireless communication is described. The code may include instructions executable to determine a timing of an interfering transmission by the first modem according to a first radio access technology (RAT), and toggle a use of interference rejection combining (IRC) during receive operations of the second modem according to a second RAT, wherein toggling is based at least in part on the determined timing of the interfering transmission.

In some examples of the method, apparatuses, or non-transitory computer-readable medium described herein, toggling the use of IRC during the receive operations at the second modem includes using IRC to receive a signal at the second modem during the interfering transmission by the first modem. Additionally or alternatively, in some examples toggling the use of IRC during the receive operations at the second modem is further based at least in part on a signal strength of the interfering transmission.

In some examples of the method, apparatuses, or non-transitory computer-readable medium described herein, toggling the use of IRC during the receive operations of the second modem comprises using IRC to receive a signal at the second modem when the signal strength of the interfering transmission is above a predefined threshold. Additionally or alternatively, in some examples toggling the use of IRC during the receive operations of the second modem comprises using maximal ratio combining (MRC) to receive a signal at the second modem when the first modem is not transmitting the interfering transmission.

Some examples of the method, apparatuses, or non-transitory computer-readable medium described herein may further include processes, features, means, or instructions for determining a channel estimate of a signal received by the second modem, estimating a covariance of the interfering transmission using the determined channel estimate, and determining a weight vector for the IRC using the estimated covariance. Additionally or alternatively, in some examples the covariance of the interfering transmission is estimated based at least in part on a training field of a preamble associated with the signal received by the second modem.

Some examples of the method, apparatuses, or non-transitory computer-readable medium described herein may further include processes, features, means, or instructions for dividing a bandwidth of the signal received by the second modem into multiple subbands, and the estimating the covariance of the interfering signal is performed by estimating the covariance over each of the multiple subbands. Additionally or alternatively, in some examples the determining the weight vector for the IRC comprises determining a respective weight vector for the IRC for each of the multiple subbands using the estimated covariance for the corresponding subband.

Some examples of the methods, apparatuses, or non-transitory computer-readable media described herein further include processes, features, means, or instructions for time-controlled spatial interference rejection. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

According to the present disclosure, a multi-mode device opportunistically switches between spatial filtering techniques to enhance the received symbol estimates based at least in part on identifying, at a first modem, an interfering communication from a second modem. Aspects of the disclosure are described in the context of a wireless communication system. For example, a STA that supports WLAN and WWAN communications can communicate with both an AP and a base station. The STA toggles an IRC receive chain "on" for a WLAN transmission, while the STA concurrently transmits a WWAN communication. The WWAN modem enables the IRC receive chain based at least in part on determining the transmission timing for the WWAN communication. The WWAN modem determines a channel estimate and interference covariance measurement based at least in part on the location of the WWAN communication in relation to the received WLAN communication.

In one example, a STA has a dual-modem configuration that includes an LTE modem and a Wi-Fi modem. The Wi-Fi modem determines an transmission timing for communication from/to the LTE modem. When the LTE modem begins transmitting, the Wi-Fi modem concurrently employs an IRC receiver. The Wi-Fi modem also identifies whether the LTE transmission overlaps with the LTF field of the Wi-Fi transmission that is used for channel estimation. The Wi-Fi modem uses the LTF field of the Wi-Fi transmission to determine a channel estimate with or without including the interference from the LTE transmission. The Wi-Fi modem then generates the interference covariance associated with the LTE transmission based at least in part on determining whether the interference overlaps with the LTF field. The channel estimate and interference covariance are used to determine IRC weights for processing the Wi-Fi transmission and decoding the Wi-Fi data.

When the LTE modem ceases transmissions, the Wi-Fi modem toggles the IRC receiver off and uses an MRC receiver. The MRC receiver determines MRC weights and applies processes Wi-Fi transmission while there is not interference from the LTE modem. These and other aspects of the disclosure are further illustrated by and described with reference to apparatus diagrams, system diagrams, and flowcharts.

Figure 1:
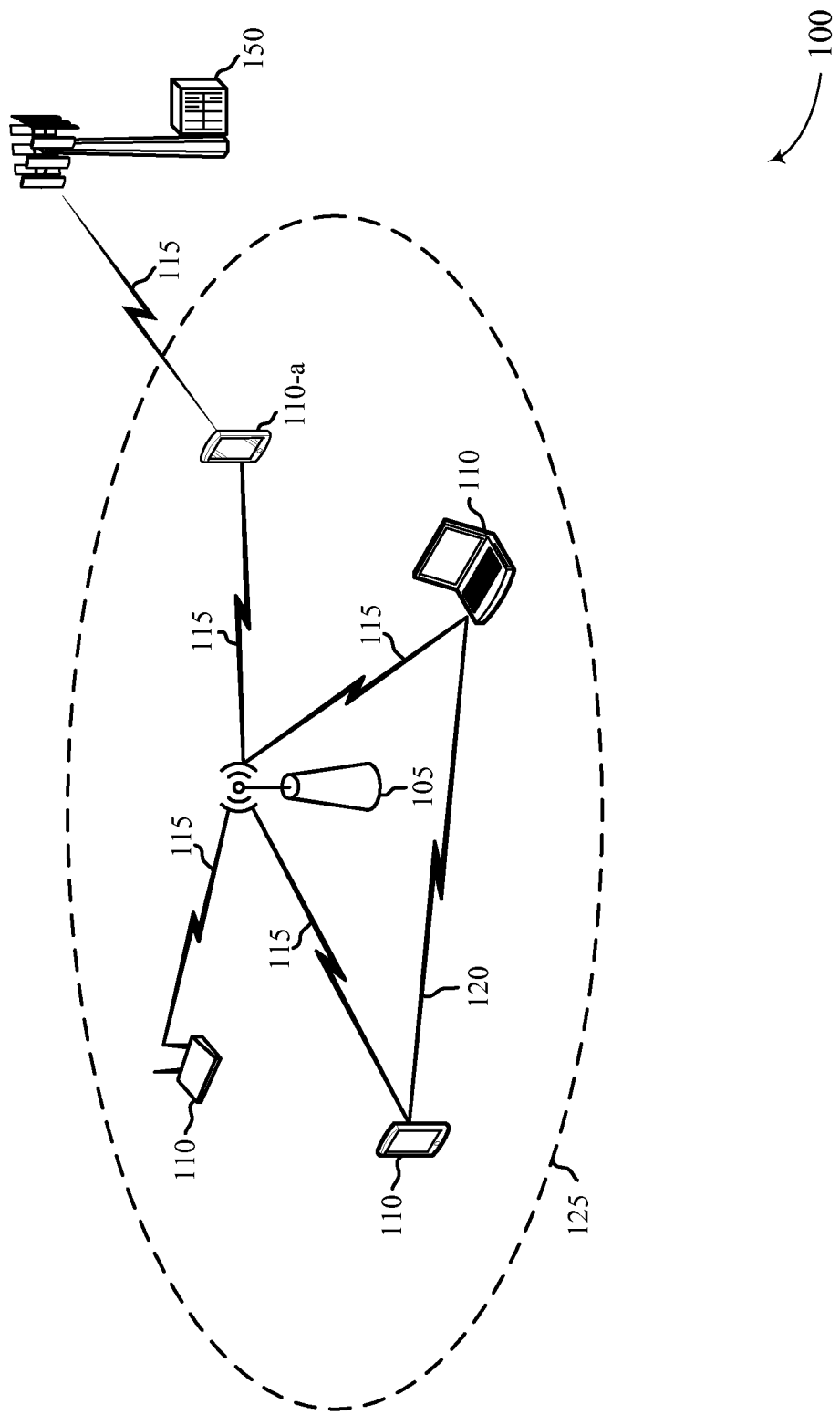
FIG. 1 illustrates an example of a wireless communications system that supports time-controlled spatial interference rejection in accordance with various aspects of the present disclosure.

FIG. 1 illustrates an example of a wireless communications system 100 that supports time-controlled spatial interference rejection in accordance with various aspects of the present disclosure. The WLAN 100 includes an access point (AP) 105 and STAs 110 labeled as STA_1 through STA_7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 is stationary, mobile, or a combination thereof. Some STAs 110, such as STA 110-a, also communicate with a base station 150 over a wireless wide area network (WWAN). A WWAN may utilize shared spectrum, dedicated spectrum, or a combination of the two for communications to/from a STA.

Although not shown in FIG. 1, a STA 110 can be covered by more than one AP 105 and can therefore associate with multiple APs 105 at different times. A single AP 105 and an associated set of STAs 110 is referred to as a basic service set (BSS). An extended service set (ESS) is a set of connected BSSs. A distribution system (DS) (not shown) is used to connect APs 105 in an extended service set. A coverage area 125 for an AP 105 can be divided into sectors making up only a portion of the coverage area (not shown). The WLAN 100 includes APs 105 of different types (e.g., metropolitan area, home network, etc.), with varying sizes of coverage areas and overlapping coverage areas for different technologies. Although not shown, other devices can communicate with the AP 105.

While the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc. Some STAs 110 are capable of operating over both a WWAN and WLAN network. For instance, STA 110-a communicates with base station 150 via communication link 115. The WWAN network utilizes one or both of shared and dedicated spectrum for communications between base station 150 and STA 110-a. WWAN communications are often scheduled by a central node, such as a base station 150. WWAN communications over shared spectrum can also be scheduled by a base station 150. For instance, the base station 150 schedules downlink and uplink subframes for transmissions between base station 150 and STA 110-a. Additionally or alternatively, STA 110-a can transmit a scheduling request to base station 150 without scheduling from base station 150.

STAs 110 communicating over shared spectrum, such as a WLAN network, use contention-based procedures prior to transmitting to prevent collisions between transmissions from multiple STAs 110. Request to Send (RTS)/Clear to Send (CTS) is one example of a contention based procedure during which a STA 110 sends an RTS frame to an AP 105. Once the recipient device receives the RTS frame, the recipient device can confirm the communication link by sending a CTS frame. After the CTS frame is received by the STA, the STA begins transmitting data to the recipient device. In this way, RTS/CTS messaging reduces frame collisions by enabling devices, such as a STA 110 or AP 105, to in essence clear the communication path before transmitting data. Enhanced Distributed Channel Access (EDCA) is another contention-based procedure used to transmit over shared spectrum. EDCA utilizes interframe spacing, contention windows, and energy detection to prevent collisions without pre-coordination.

Accordingly, WWAN communications also use contention-based protocols to communicate over shared spectrum. In order to access and transmit over a carrier that uses shared spectrum, STA 110-a and base station 150 perform clear channel assessments (CCAs) prior to transmitting. A CCA is conducted according to listen before talk (LBT) parameters (e.g., contention window size, deferral period, CCA threshold, etc.), and is associated with a duration during which a WWAN device monitors the shared channel for transmission activity. In one example, a base station 150 uses energy detection techniques to determine if the channel is occupied, and after determining the channel is clear, transmits downlink data over the shared spectrum (e.g., 2.5 GHz and/or 5 GHz bands). The downlink data includes both scheduling information for subsequent uplink transmissions (e.g., designated uplink subframes) and data for the STA 110-a. STA 110-a similarly performs CCA procedures prior to transmitting uplink data during the scheduled uplink transmissions periods. In cases where the base station 150 does not identify the channel is clear, the base station 150 refrains from transmitting until a successful CCA is performed. Despite using these contention based techniques, WWAN communications over the shared spectrum still interfere with WLAN communications over the shared spectrum. For instance, out-of-band emissions associated with data transmissions to/from base station 150 to STA 110-a interfere with concurrent data reception at STA 110-a from AP 105.

A received signal y(f) is mathematically modeled as shown below:

$$y(f)=h_1(f)x_1(f)+z(f)+n(f), \quad (1)$$

where y(f) is the received $N_r \times 1$ signal vector (e.g., a WLAN signal); $x_1(f)$ is the modulation symbol during the data region of the frame or a known pilot tone in the case of the preamble region of the frame; $h_1(f)$ is the received $N_r \times 1$ channel (e.g., a shared channel) associated with the desired signal; z(f) is the received $N_r \times 1$ interfering signal (e.g., an WWAN transmission); and n(f) is the received $N_r \times 1$ thermal noise. The thermal noise covariance $R_{nn}$ is shown below:

$$R_{nn}=E_f[n(f)n^*(f)]=\sigma^2 I_{N_r}, \quad (2)$$

where $E_f[\cdot]$ is the expectation operation (or averaging) over frequency tones and the interfering signal covariance $R_{zz}$ is computed as:

$$R_{zz}=E_f[z(f)z^*(f)]. \quad (3)$$

The system model can be re-written as:

$$y(f)=h_1(f)x_1(f)+u(f), \quad (4)$$

$$u(f)=z(f)+n(f), \quad (5)$$

where u(f) is the combined noise and interference.

A STA 110 uses a myriad of techniques to mitigate interference, such as z(f), at a receiver, one of which is time-domain filtering. Another technique, for STAs 110 with multiple antennas, is spatial filtering, which exploits the signals received at each of $N_r$ antennas. Each received signal experiences different channel conditions during the transmissions process and can be combined at a STA 110 to create a refined signal. Linear minimum mean-squared error (LMMSE), interference rejection combining (IRC), and maximal-ratio combining (MRC) are examples of interference mitigation techniques used by a STA 110. MRC reconstructs a received signal based at least in part on the corresponding channel conditions, while IRC reconstructs a received signal based at least in part on the corresponding channel conditions and interference over the channel. Both MRC and IRC generate weight vectors that are applied to a received signal to reconstruct the transmitted signal. The MRC receiver weights are computed to be:

$$w_{MRC}(f)=\hat{h}_1(f), \quad (6)$$

and the soft symbol output (i.e., original symbol estimate) after MRC is computed to be:

$$\hat{x}_{1,MRC}(f)=w^*_{MRC}(f)y(f), \quad (7)$$

It is assumed in (6) and (7) that the noise variance across the receiver chains are identical. On the other hand the IRC receiver weights are computed to be:

$$w_{IRC}(f)=R_{uu}^{-1}\hat{h}_1(f), \quad (8)$$

where the combined interference covariance $R_{uu}$ is given as:

$$R_{uu}=R_{zz}+\sigma^2 I_{N_r}, \quad (9)$$

and the soft symbol output for IRC is computed to be:

$$\hat{x}_{1,IRC}(f)=w^*_{IRC}(f)y(f). \quad (10)$$

In certain scenarios, MRC techniques provide enhanced symbol estimates over IRC techniques and vice versa. For instance, MRC techniques provide improved symbol estimates over IRC techniques when interference is not present on a shared channel, while IRC provides improved symbol estimates over MRC when interference, such as a WWAN transmission, is present. In one example, a STA 110, such as STA 110-a, opportunistically switches between spatial filtering techniques to enhance the transmitted symbol estimate based at least in part on identifying interference on the shared channel. In one example, the WLAN modem determines the timing of a WWAN transmission from the WWAN modem that is interfering or will interfere with a WLAN transmission and toggles between MRC and IRC techniques based at least in part on the determined timing. For instance, the WWAN modem at STA 110-a sends a signal to the WLAN modem at STA 110-a to indicate that the WWAN modem is transmitting. Accordingly, the WLAN modem determines that an interfering transmission is occurring and toggles the receiver mode to use IRC for subsequent reception. The WLAN modem generates IRC weights based at least in part on a computed interference covariance and a channel estimate that is computed during a training symbol field of a received WLAN frame.

Figure 2:
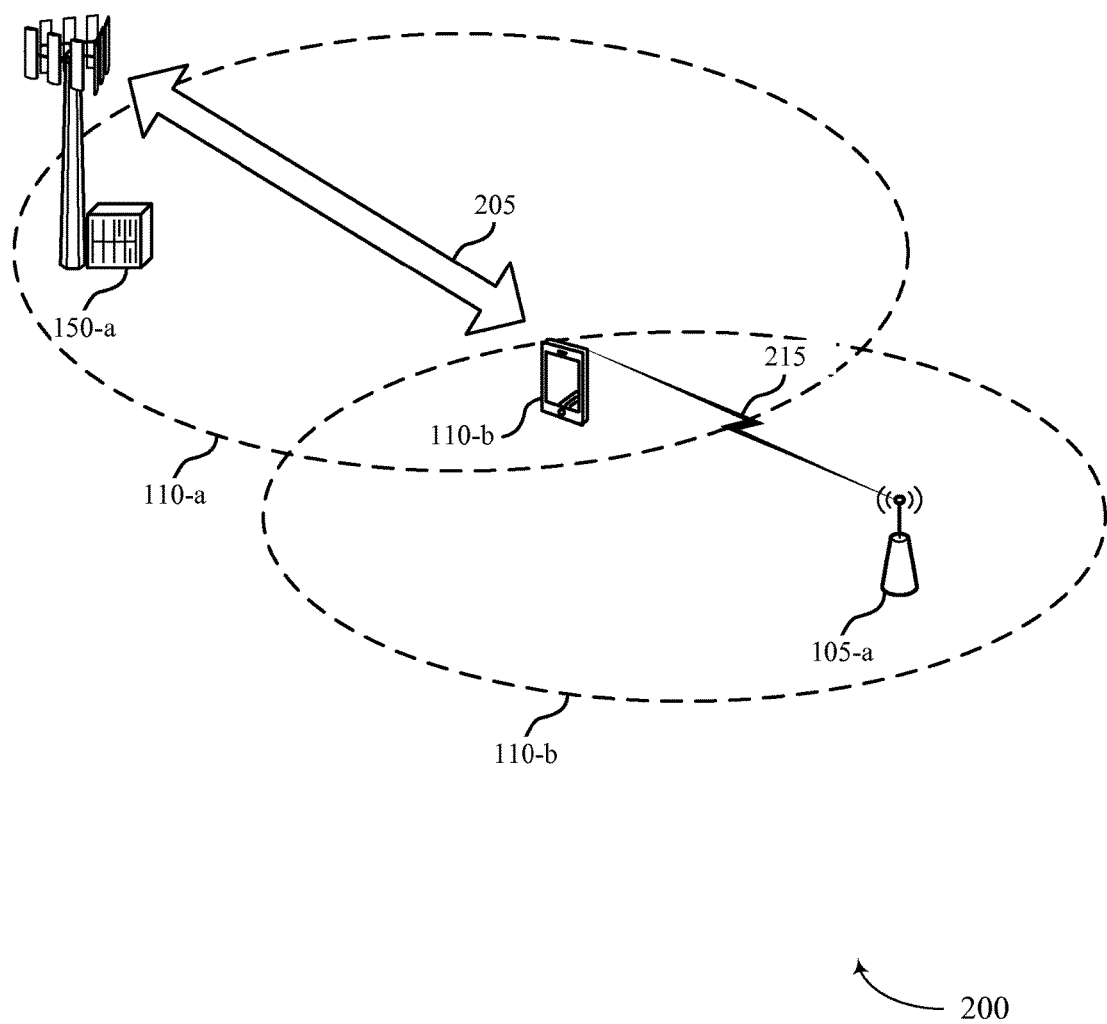
FIG. 2 illustrates an example of a wireless communications subsystem for time-controlled spatial interference rejection in accordance with various aspects of the present disclosure.

FIG. 2 illustrates an example of a wireless communications subsystem 200 for time-controlled spatial interference rejection in accordance with various aspects of the present disclosure. Wireless communications subsystem 200 includes STA 110-b, AP 105-a, and base station 150-a which are examples of a STA 110, an AP 105, or a base station 150 described above with reference to FIG. 1. In one example STA 110-b is an example of STA 110-a, as described in FIG. 1, and toggles between spatial filtering techniques for data reception. In this example, STA 110-b includes both a Wi-Fi modem and an LTE modem and is capable of communicating using a Wi-Fi network and a LTE network. Base station 150-a is an LTE device and AP 105—is a Wi-Fi device. STA 110-b communicates with base station 150-a via communication link 205 and with AP 105-a via communication link 215.

In a first example, STA 110-b transmits data to base station 150-a and the LTE modem transmits a control signal to the Wi-Fi modem indicating that an LTE transmission is occurring. Accordingly, the Wi-Fi modem toggles the spatial filtering technique used at the Wi-Fi receiver to IRC. Subsequently, STA 110-b begins receiving a Wi-Fi transmission from AP 105-a. The Wi-Fi transmission includes preamble fields, such as short training fields (STFs), long training fields (LTFs), and signal fields (SIGs). The symbols transmitted during an LTF are known to STA 110-b and are used to develop channel estimates. In this example, the LTE transmissions continue throughout the Wi-Fi transmission, and the Wi-Fi preamble includes an LTF that the Wi-Fi modem uses to determine an estimate for the shared channel $\hat{h}_1(f)$. After determining the shared channel estimate, the Wi-Fi modem also determines a combined interference estimate $\hat{u}(f)=y(f)-\hat{h}_1(f)x_1(f)$, $f \in F$ based at least in part on the received signal $y(f)$, the shared channel estimate $\hat{h}_1(f)$, and the known LTF signal/symbol $x_1$. Wi-Fi modem then determines the combined interference covariance $R_{uu}=1/F\Sigma_{f\in F}\hat{u}(f)\hat{u}^*(f)$. Alternately, the interference covariance is computed by $R_{uu}=R_{uu}-R_{hh}$, where $R_{hh}$ is the estimated channel correlation matrix. The IRC weights $w_{IRC}(f)=R_{uu}^{-1}\hat{h}_1(f)$ are generated and applied to subsequently received data. In this example, at the expiration of the preamble, the Wi-Fi modem begins receiving Wi-Fi data. The IRC weights are applied to the subsequently received data signals and a soft symbol outputs $x_{1,IRC}$ is be generated as $\hat{x}_{1,IRC}(f)=w^*_{IRC}(f)y(f)$.

In a second example, STA 110-b receives a Wi-Fi transmission prior to the LTE transmission, and the LTE transmission is initiated prior to the LTF of the Wi-Fi preamble used for channel estimation. As above, the Wi-Fi modem determines the LTE transmission timing and enables IRC for receiving the Wi-Fi transmission. Also as above, the Wi-Fi modem uses the LTF received during the Wi-Fi preamble to determine the combined interference covariance for generating IRC weights and the soft symbol outputs for the received Wi-Fi data.

Figure 3A:
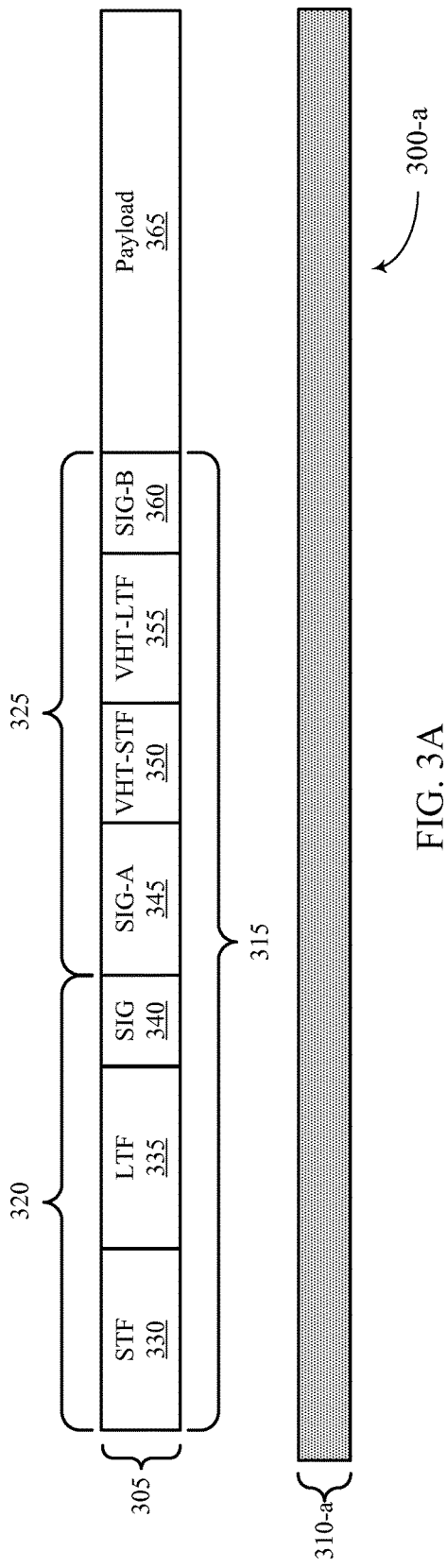
FIGS. 3A to 3C illustrate examples of shared channels that support time-controlled spatial interference rejection in accordance with various aspects of the present disclosure.
Figure 3B:
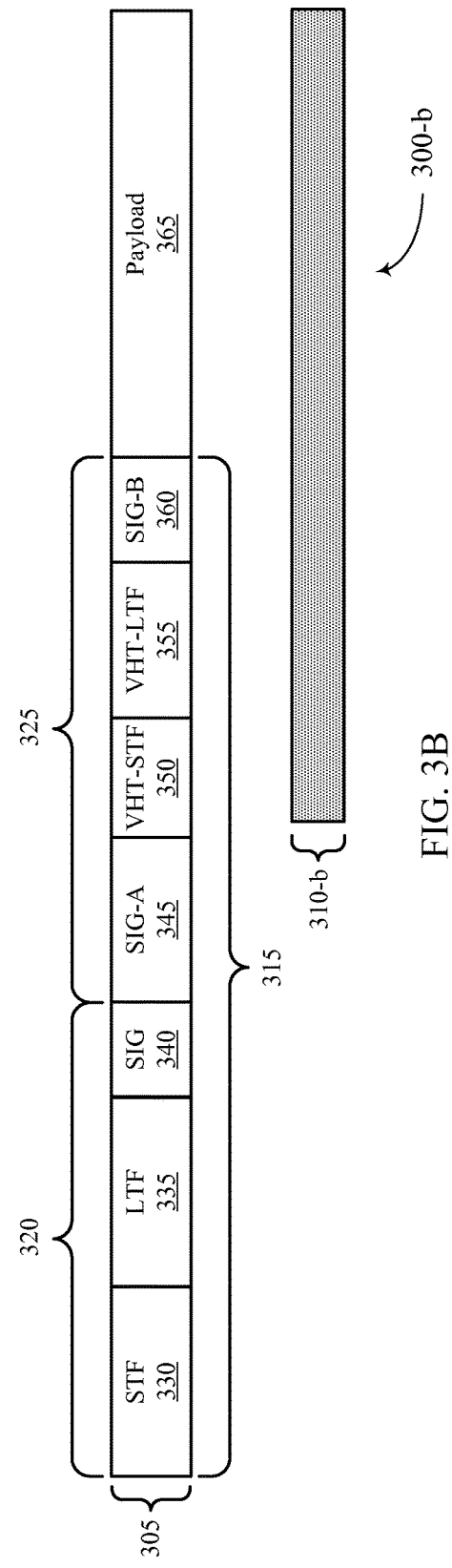
Figure 3C:
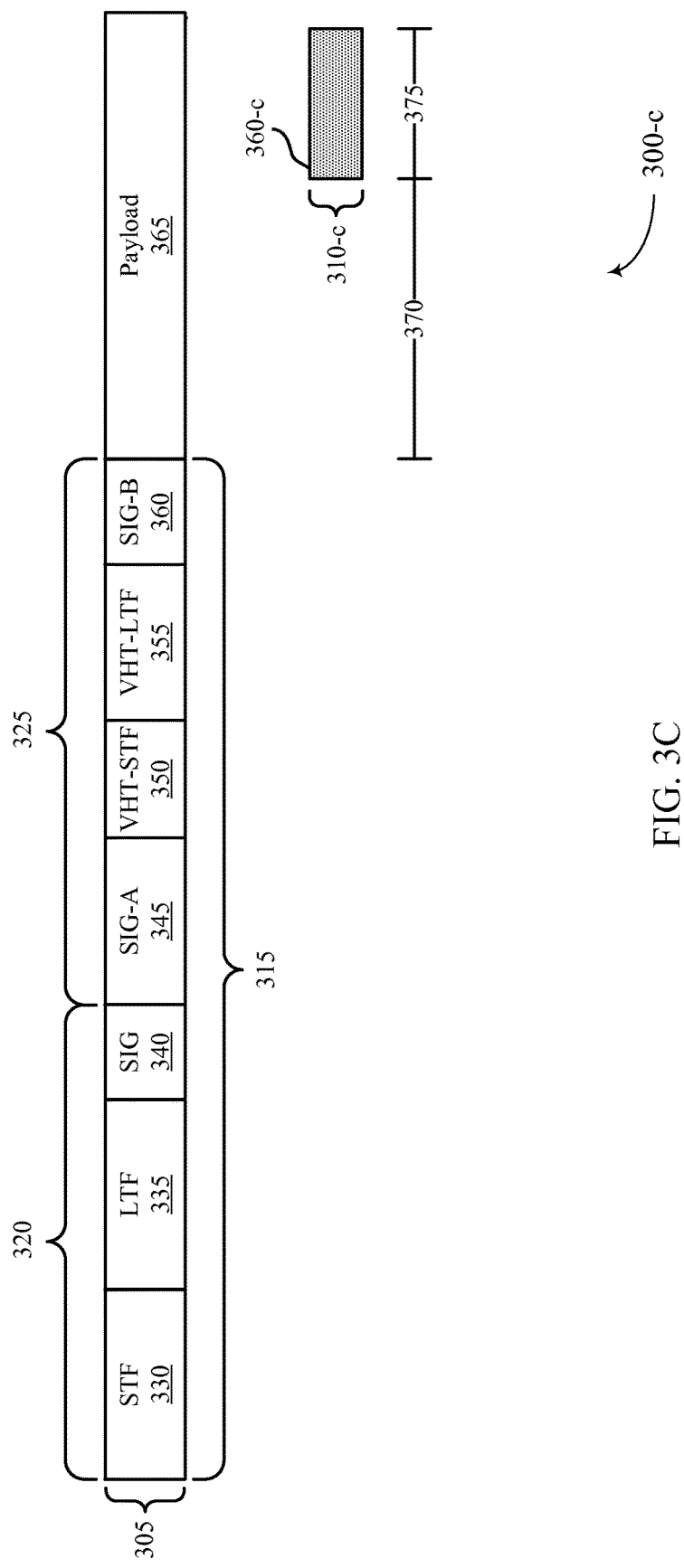

In a third example, STA 110-b receives a Wi-Fi transmission prior to the LTE transmission, and the LTE transmission is initiated after the LTF of the Wi-Fi preamble used for channel estimation is transmitted. In this example, the LTE transmission is further initiated during the second half of the Wi-Fi transmission's data region. Accordingly, STA 110-b uses the combined interference covariance computed from a previous LTF (e.g., the latest computed combined interference signal covariance), in addition to a channel estimate from the current LTF to determine the IRC weights. Additionally or alternatively, STA 110-b directs the LTE modem to transmit a low power signal during the LTF preamble to determine a combined interference covariance estimate. Each of the above examples may be further understood with respect to at least the following figures: FIGS. 3A to 3C.

FIGS. 3A to 3C illustrate examples of shared channels 300 that support time-controlled spatial interference rejection in accordance with various aspects of the present disclosure. A shared channel 300 illustrates aspects of a transmission between a STA 110, an AP 105, and a base station 150, as described above with reference to FIGS. 1-2. A shared channel 300 includes Wi-Fi transmissions 305 and LTE transmissions 310. A Wi-Fi transmission 305, based at least in part on IEEE 802.11ac, includes a legacy preamble 320, a very high throughput (VHT) preamble 325, and a payload 365, which includes data for a receiving STA 110. The legacy preamble 320 includes as short training field (STF) 330, long training field (LTF) 335, and a signaling (SIG) 340, and the VHT preamble 325 includes a first SIG field, SIG-A 345, a second SIG field, SIG-B 360, a VHT-STF 350, and a VHT-LTF 355.

FIG. 3A illustrates a first example, where a Wi-Fi transmission 305 and an interfering LTE transmission 310-a occur over shared channel 300-a. In this example, a STA 110 transmits LTE transmission 310-a over shared channel 300-a prior to a STA 110 receiving a Wi-Fi transmission 305. The Wi-Fi modem determines the transmission timing for LTE transmission 310-*a*. In one example, the Wi-Fi modem determines the transmission timing based at least in part on a control signal sent by the LTE modem to the Wi-Fi modem concurrently with the start of LTE transmission 310-*a*. In another example, the Wi-Fi modem determines the transmission timing based at least in part on scheduling information provided by the LTE modem, such as start time, end time, periodicity, etc. In either case, the control signal indicates that LTE transmission 310-*a* is in progress, and after receiving the indicator, the Wi-Fi modem enables IRC spatial filtering at the Wi-Fi receiver for the duration of LTE transmission 310-*a*. During VHT-LTF 355, the Wi-Fi modem determines a channel estimate for the received signal. This channel estimate is used to determine the combined interference estimate $\hat{u}(f)$ and the combined interference covariance $R_{uu}$. As above, $R_{uu}$ and the channel estimate $\hat{h}_1(f)$ are used to determine the IRC weights.

LTE transmission 310-*a* continues throughout payload 365 and the determined IRC weights are applied to the data received during payload 365 to produce the soft symbol outputs $\hat{x}_{1,IRC}$. In some examples, LTE transmission 310-*a* terminates prior to the end of payload 365. In one example, the LTE modem signals to the Wi-Fi modem that the LTE transmission 310-*a* has completed and the Wi-Fi modem toggles from the receiver from using IRC to a different spatial filtering technique (e.g., MRC). In other example, the Wi-Fi modem determines the transmission is complete based at least in part on received scheduling information.

FIG. 3B illustrates a second example, where a Wi-Fi transmission 305 and an interfering LTE transmission 310-*b* occur over shared channel 300-*b*. In this example, a STA 110 transmits LTE transmission 310-*b* while the STA 110 is receiving Wi-Fi transmission 305. The Wi-Fi modem determines the transmission timing for LTE transmission 310-*b* as based at least in part on a control signal received from the LTE modem. The Wi-Fi modem enables IRC spatial filtering at the Wi-Fi receiver for the duration of LTE transmission 310-*b* based at least in part on the determined transmission timing. Since LTE transmission 310-*b* occurs prior to VHT-LTF 355, the Wi-Fi modem uses VHT-LTF 355 to determine a channel estimate and the combined interference covariance estimate for the received signal as described above.

FIG. 3C illustrates a third example, where a Wi-Fi transmission 305 and an interfering LTE transmission 310-*c* occur over shared channel 300-*c*. In this example, a STA 110 transmits LTE transmission 310-*b* while the STA 110 is receiving the payload 365 of Wi-Fi transmission 305. The Wi-Fi modem determines the transmission timing for LTE transmission 310-*b* as based at least in part on a control signal from the LTE modem. Since LTE transmission 310-*c* occurs in the subsequent to the beginning of payload 365, the Wi-Fi modem uses a first spatial filtering technique (e.g., MRC) during time period 370 and uses a IRC during the time period 375 when LTE transmission 310-*c* is in progress. In this example, LTE transmission 310-*c* does not overlap with VHT-LTF 355, and therefore the Wi-Fi modem uses a prior combined interference covariance estimate in addition to the current channel estimate obtained from VHT-LTF 355 to determine the IRC weights. In this example, the Wi-Fi modem uses the most recent combined interference covariance to determine the IRC weights and the soft outputs for the data transmitted during time period 375. In other examples, the Wi-Fi modem averages a number of prior combined interference covariance measurements. Additionally or alternatively, the LTE modem transmits a low power signal during VHT-LTF 355 to enable a combined interference covariance estimate to be generated. In some cases, VHT preamble 325 is implemented as HE (high efficiency) preamble, based at least in part on IEEE 802.11ax. An HE preamble has a similar structure as a VHT preamble and includes a first signal field, SIG-A, a second signal field, SIG-B, an HE-STF, and an HE-LTF. The HE preamble can be included in a Wi-Fi transmission, such as Wi-Fi transmission 305, which also includes a legacy preamble and a payload.

Figure 4:
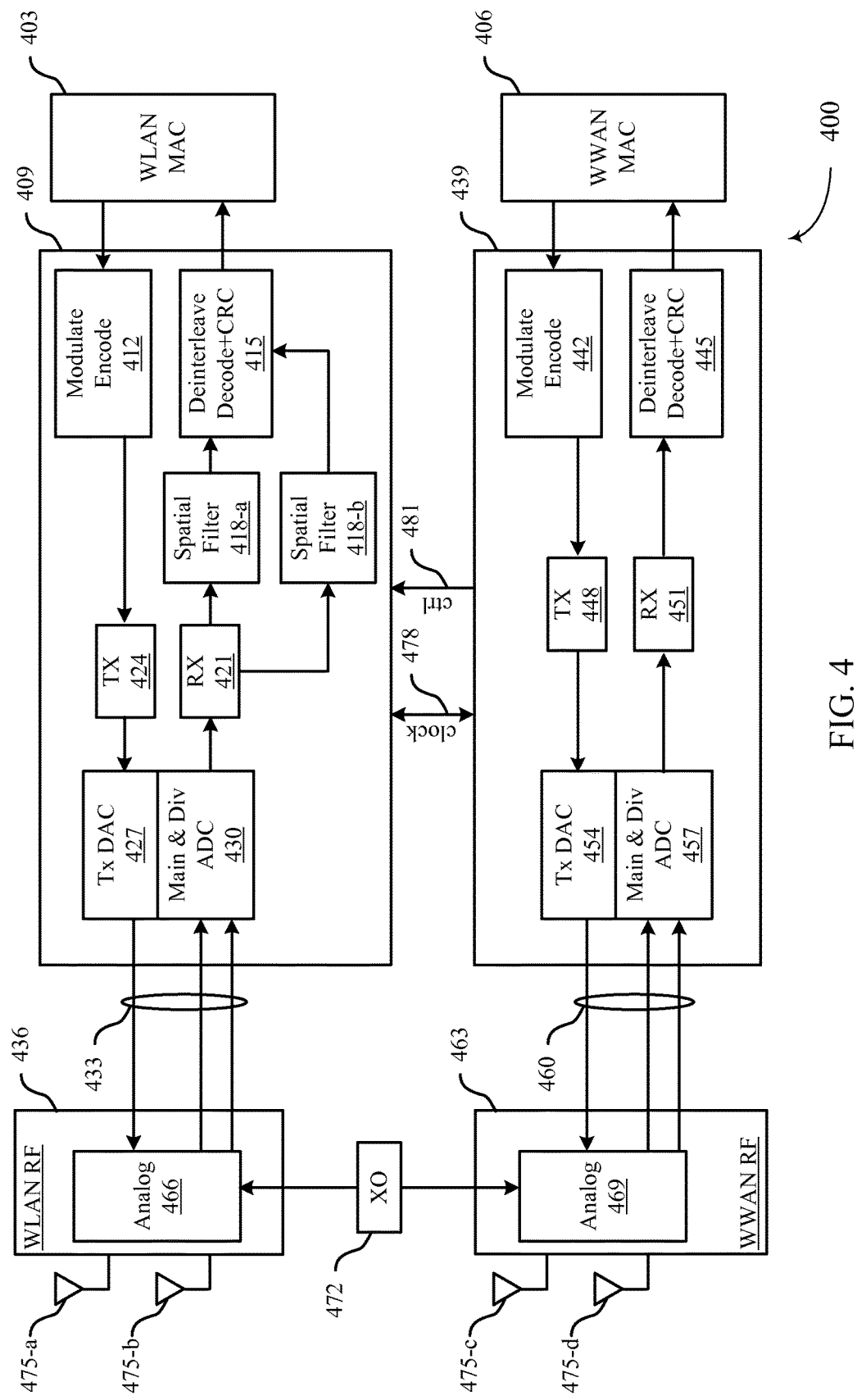
FIG. 4 illustrates an example of a dual modem configuration that supports time-controlled spatial interference rejection in accordance with various aspects of the present disclosure.

FIG. 4 illustrates an example of a dual modem configuration 400 that supports time-controlled spatial interference rejection in accordance with various aspects of the present disclosure. The dual modem configuration 400 illustrates aspects of a transmission between a STA 110, an AP 105, and a base station 150, as described above with reference to FIGS. 1-3. Dual modem configuration 400 includes WLAN modem 409 and WWAN modem 439. In one example, the dual modem configuration 400 is included in the STA 110-*b* as described in FIG. 2, where the WWAN modem 439 is an LTE modem and the WLAN modem 409 is a Wi-Fi modem. WLAN modem 409 includes a transmitter a modulator 412, decoder 415, spatial filter(s) 418, transmitter 424, receiver 421, transmitter DAC 427, and receiver ADC 430. The WLAN modem 409 is coupled to the RF front end, WLAN RF 436 via analog traces 433 and the WLAN MAC 403. WLAN analog traces 433 include a trace for transmitting data and two traces for receiving data over the main antenna 475-*a* and the diversity antenna 475-*b*. WLAN RF 436 also includes an analog component 466, such as a power amplifier for transmitting or a bandpass filter for receiving.

WWAN modem 439 includes a modulator 442, a decoder 445, a transmitter 448, a receiver 451, a transmitter DAC 454, and a receiver ADC 457. WWAN modem 439 is coupled to the WWAN MAC 406 and to the RF front end, WWAN RF 463, via WWAN analog traces 460. WWAN analog traces 460 include a trace for transmitting data and two traces for receiving data over the main antenna 475-*c* and the diversity antenna 475-*d*. WWAN RF 463 also include an analog component for receiving and transmitting signals. The WLAN modem 409 and the WWAN modem 439 share a common clock 478 and WWAN modem 439 provides control signals via control line 481 to the WLAN modem 409. A timing signal from crystal oscillator 472 is provided to analog component 466 and analog component 469.

In one example, WWAN modem 439 provides a control signal via control line 481 to WLAN modem 409 that indicates to the WLAN modem 409 a transmission timing for a WWAN communication (e.g., transmission or reception). The WLAN modem 409 toggles between a first spatial filter 418-*a* in the receive chain (e.g., MRC) and a second spatial filter 418-*b* in the receive chain (e.g., IRC) based at least in part on the received control signal. For instance, WLAN modem 409 determines that an interfering WWAN transmission is in progress and activates spatial filter 418-*b*. If the WLAN modem 409 is receiving a WLAN signal at the time the control signal is received, the WLAN modem determines a channel estimate and a combined interference covariance. In this example, the channel estimate and interference covariance are generated as described with respect to FIGS. 3A to 3C. The WLAN modem 409 uses the channel estimate and combined interference covariance to generate IRC weights for spatial filter 418-*b*. The IRC weights are applied to the received WLAN signal via spatial filter 418-*b* and the WLAN signal is deinterleaved, decoded, and or appended with a cyclic redundancy check (CRC) at decoder 415.

Figure 5:
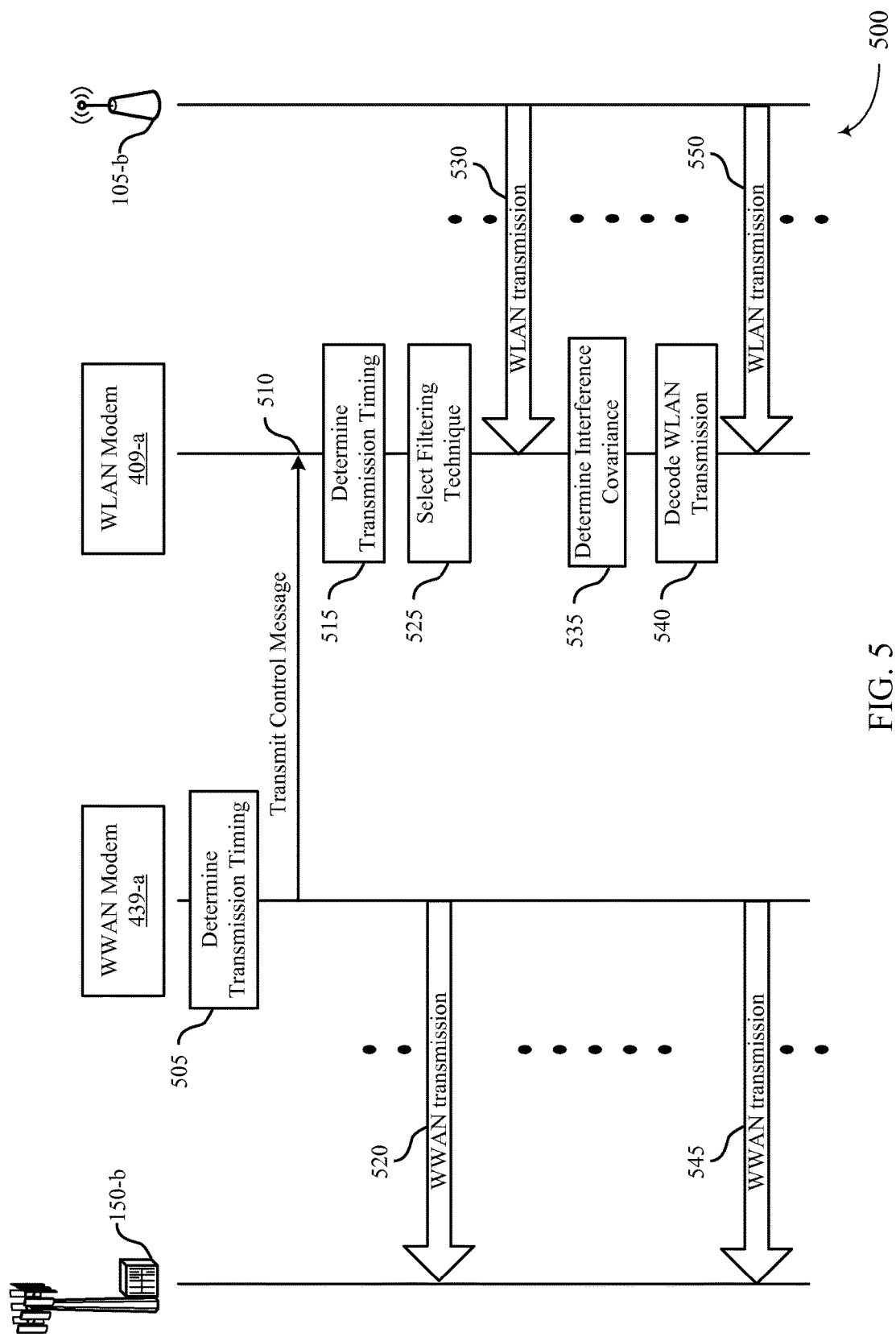
FIG. 5 illustrates an example of a process flow for time-controlled spatial interference rejection in accordance with various aspects of the present disclosure.

FIG. 5 illustrates an example of a process flow 500 for time-controlled spatial interference rejection in accordance with various aspects of the present disclosure. Process flow 500 is be performed by WWAN modem 439-a and WLAN modem 409-a, which are examples of a WWAN modem 439 and a WLAN modem 409 and are utilized for transmissions between a STA 110 and a base station 150 described above with reference to FIGS. 1-4. In some examples, the WWAN modem 439-a indicates to the WLAN modem 409-a, a transmission timing during which a WLAN modem 409-a toggles between filtering techniques (e.g., IRC and MRC).

At 505, WWAN modem 439-a determines the transmission timing for subsequent WWAN transmissions. WWAN modem 439-a determines the transmission timing based at least in part on identifying the beginning of a WWAN communication, identifying the end of the WWAN communication, identifying a WWAN communication is ongoing, identifying that a WWAN communication is scheduled, etc.

At 510, WWAN modem 439-a transmits a control message to WLAN modem 409-a that indicates the determined transmission timing. In this example, the control message is transmitted via a control line between WWAN modem 439-a and WLAN modem 409-a, such as control line 481 described in FIG. 4. The timing between WWAN modem 439-a and WLAN modem 409-a is also synchronized based at least in part on a common clock.

At 515, WLAN modem 409-a determines the WWAN transmission 520 timing based at least in part on the received control message. As mentioned above, the transmission timing can alert WLAN modem 409-a to the start and/or end times of a transmission, an ongoing transmission, and/or a communication schedule. Based at least in part on the received control message, WLAN modem 409-a can determine the transmission timing subsequent to, concurrently with, or prior to WWAN transmission 520. In this example, WLAN modem 409-a determines the transmission timing prior to WWAN transmission 520. WWAN transmission 520 is transmitted from WWAN modem 439-a to base station 150-b over a band that interferes with (e.g., is nearby or overlaps with a the band) the band used by WLAN modem 409-a and AP 105-b. WWAN transmission 520 can start prior to WLAN modem 409-a receiving a WLAN transmission, such as WLAN transmission 530, during the preamble of WLAN transmission 530, subsequent to the preamble of the WLAN transmission 530, etc., as shown with respect to FIGS. 3A to 3C. In this example, the WWAN transmission occurs prior to a received WLAN signal.

At 525, WLAN modem 409-a selects a filtering technique 525 based at least in part on the determined transmission timing. For control messages that alert WLAN modem 409-a that a transmission is currently in progress, the WLAN modem 409-a immediately enables IRC filtering at the receiver. For control messages that alert WLAN modem of a communication schedule or a start time, WLAN modem 409-a enables IRC filtering at the receiver according to the scheduled time.

At 530, WLAN modem 409-a receives a WLAN transmission using IRC filtering techniques based at least in part on the determined transmission timing and based at least in part on identifying that there is an ongoing WWAN transmission.

At 535, WLAN modem 409-a determines an interference covariance for the IRC filter based at least in part on the received WLAN transmission. WLAN modem 409-a uses an LTF within a WLAN preamble associated with received WLAN transmission 530 to determine a channel estimate. The channel estimate, the received signal, and the known signal included in the LTF are used to determine the interference covariance and to determine the IRC receiver weights. The IRC receiver weights are applied to the received WLAN transmission.

At 540, WLAN modem 409-a decodes the WLAN transmission based at least in part on the received signal and the applied IRC receiver weights. WLAN modem 409-a applies the receiver weights through the data region of the WLAN transmission to enhance the estimate of the received data symbols. In this example, the WWAN transmission extends through the WLAN transmission and WLAN modem 409-a applies the IRC weights throughout the WLAN data region.

At 545 and at 550, the WWAN transmission and the WLAN transmission end. The WWAN transmission can end prior to, subsequent to, or simultaneously with the WLAN transmission. For the case where the WWAN transmission terminates prior to the WLAN transmission, WLAN modem 409-a can toggle the spatial filtering techniques used to decode the WLAN transmission (e.g. toggle to use MRC filtering). In some examples, WLAN modem 409-a identifies the end of the WWAN transmission through a second control message indicating the end of the WWAN transmission or based at least in part on the end time or scheduling information provided in the first control message.

Figure 6A:
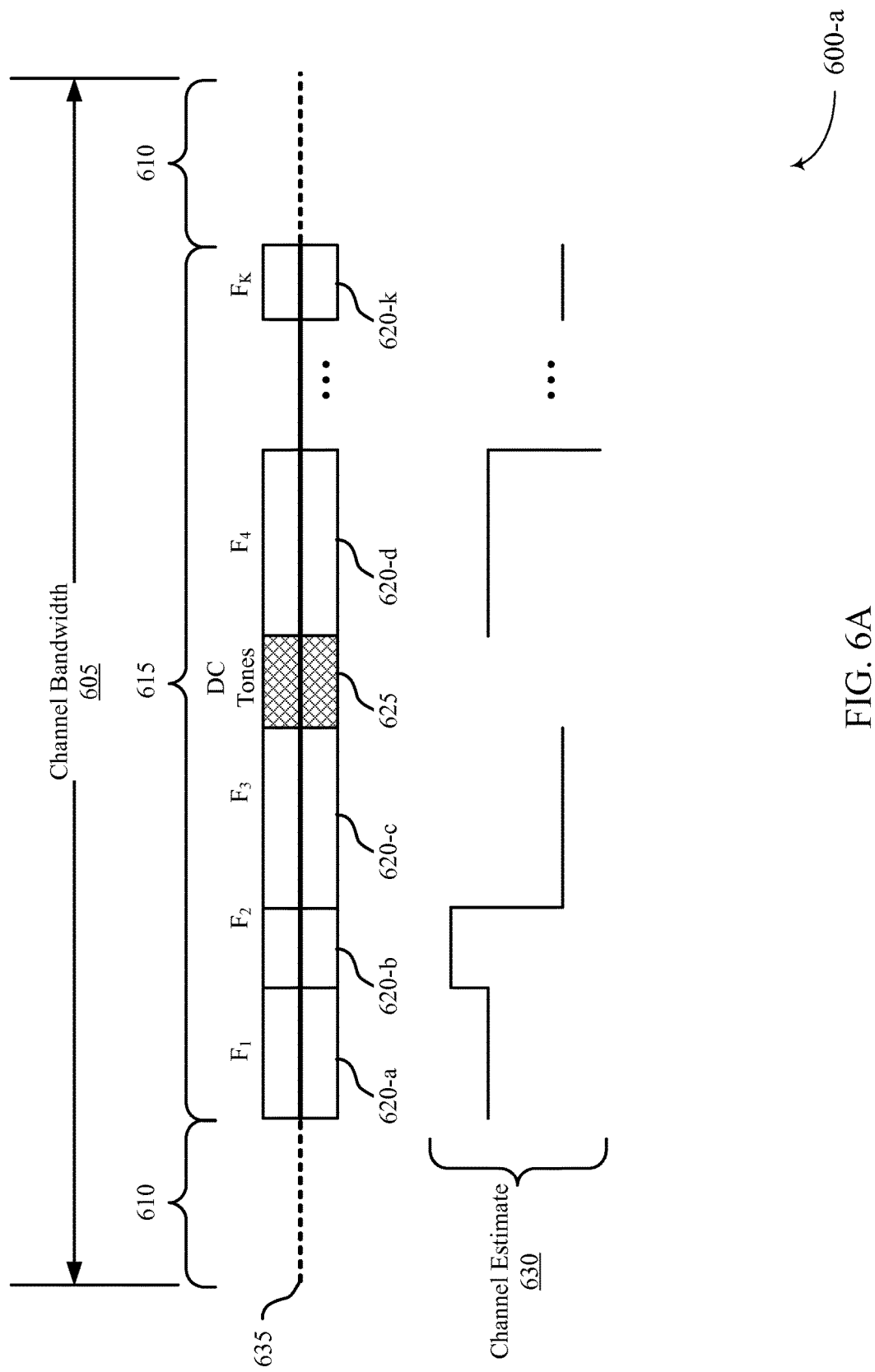
FIG. 6A illustrates an example of a partitioned channel for time-controlled spatial interference rejection in accordance with various aspects of the present disclosure.

FIG. 6A illustrates an example of a partitioned channel 600-a for time-controlled spatial interference rejection in accordance with various aspects of the present disclosure. Partitioned channel 600-a extends across channel bandwidth 605, which includes guard tones 610 and used tones 615. Used tones 615 are partitioned into K subbands 620-a to 620-k and include unused DC tones 625. Signals transmitted via used tones 615 extend over a duration of time 635. The channel estimate 630 is oftentimes based at least in part on the duration of time 635. For instance, some channels have characteristics that vary significantly over short durations of time while other channel experience stable characteristics for longer durations of time. In one example, partitioning the used tones 615 into K subbands is based at least in part on a channel estimate. For instance, channel estimate 630, which can be computed from an LTF, provides gain characteristics across the channel bandwidth 605, which a device then uses to determine the subband 620 bandwidths. The subband 620 bandwidths oftentimes will partition the channel bandwidth 605 into different sized subbands 620 in size based at least in part on the channel estimate (e.g., the frequency selectivity or the channel delay spread associated with a subband). In some examples, the subbands are evenly partitioned across the channel bandwidth 605.

Figure 6B:
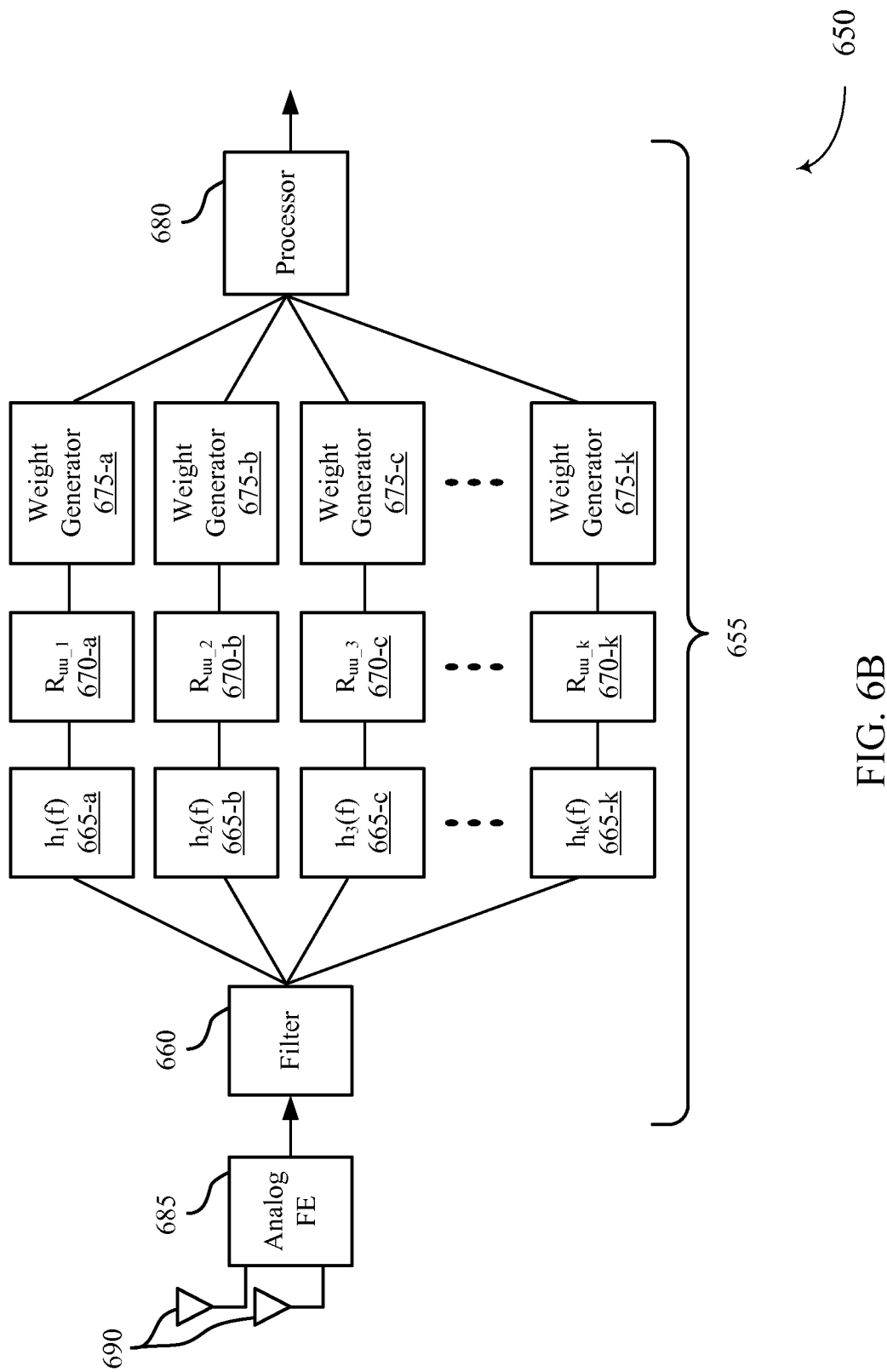
FIG. 6B illustrates an example of subband processing component for time-controlled spatial interference rejection in accordance with various aspects of the present disclosure.

FIG. 6B illustrates an example of subband processing component 650 for time-controlled spatial interference rejection in accordance with various aspects of the present disclosure. Subband processing component 650 may receive a signal over a channel bandwidth that is partitioned into multiple subbands, as described above with respect to FIG. 6A. Subband processing component 650 also includes subband processor 655, which includes a filter 660, channel estimators 665-a to 665-k, covariance estimators 670-a to 670-k, weight generators 675-a to 675-k, and processor 680, and is coupled to antennas 690 via analog front end 685.

In one example, a signal is received at antennas 690 and processed by the analog front end 685. The analog front end 685 passes the processed signal to filter 660, where the signal is separated into multiple signals associated with the different subbands. The separated signals are passed to channel estimators 665 and channel estimates, $\hat{h}_k(f)$ for each subband, k, is determined, by using the received signals, $y_k(f)$, that are associated with each subband and the known signal transmitted in an LTF, where the LTF is included in the received signals. Using the channel estimate, the received signal, and the known LTF symbol, covariance estimators 670 determine covariance estimates, $R_{uu\_k}$. The weight generators 675 then determine weights, $w_{IRC\_k}(f)$, for each subband, and use the weights to generate soft symbol outputs. The soft symbol outputs are combined at processor 680 where the soft symbol outputs can be averaged, added, or otherwise processed. In one example, soft symbol outputs associated with certain frequency subbands are given more weight in relation to other frequency subbands. For instance, a device can provide more weight to soft symbol outputs from a subband that is determined to have enhanced channel characteristics than to a subband that has degraded channel characteristics. In one example, a device determines a subband has enhanced channel characteristics based on the derived channel estimates.

Figure 7A:
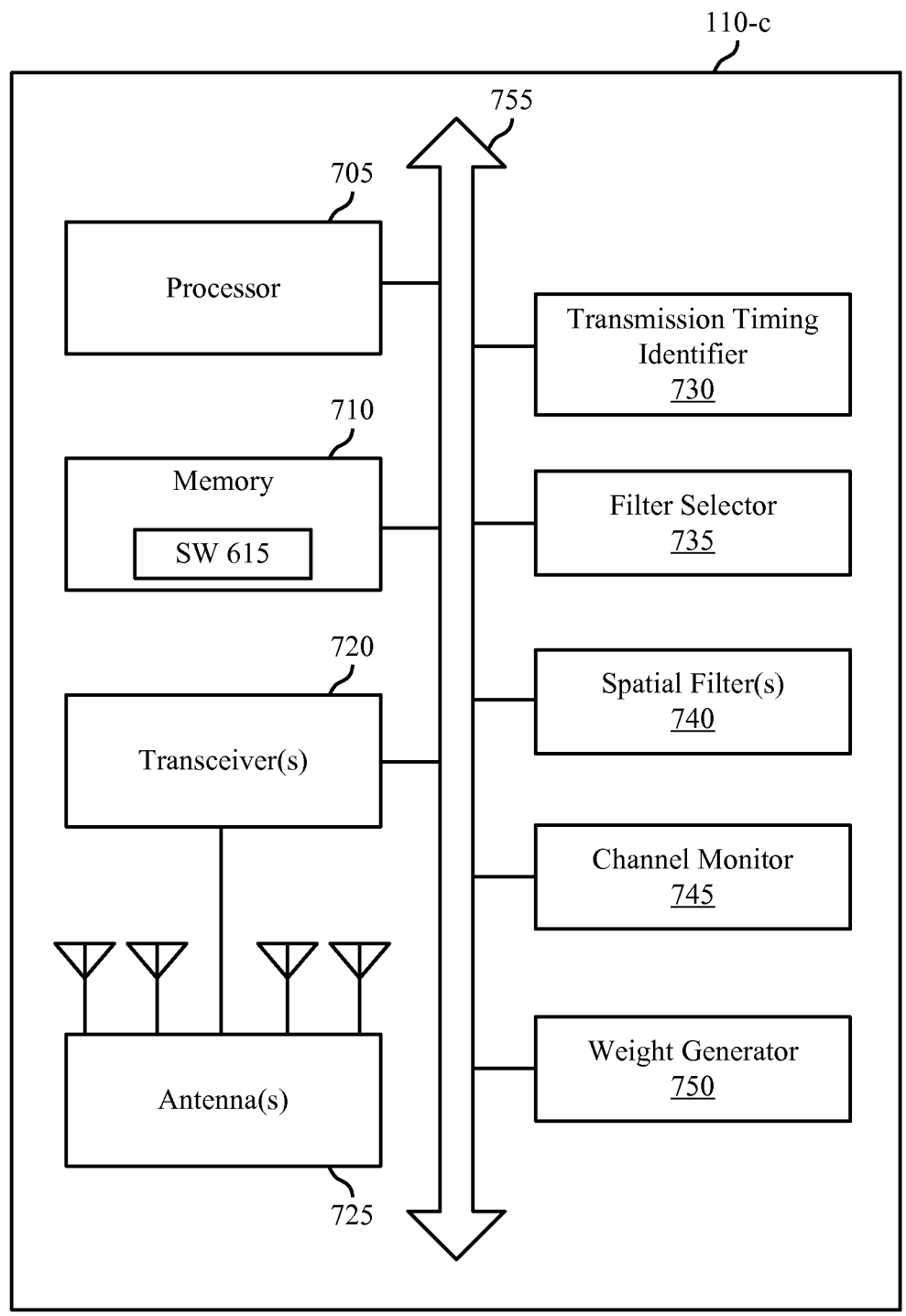
FIGS. 7A and 7B show block diagrams of an example STA that supports time-controlled spatial interference rejection in accordance with various aspects of the present disclosure.

FIG. 7A shows a block diagram 700-a of an example STA 110-c that supports time-controlled spatial interference rejection in accordance with various aspects of the present disclosure and with respect to FIGS. 1-6. The STA 110-c includes a processor 705, a memory 710, one or more transceivers 720, one or more antennas 725, a transmission timing identifier 730, a filter selector 735, spatial filter(s) 740, a channel monitor 745, and an weight generator 750. The processor 705, memory 710, transceiver(s) 720, transmission timing identifier 730, filter selector 735, spatial filter(s) 740, channel monitor 745, and weight generator 750 are communicatively coupled with a bus 755, which enables communication between these components. The antenna(s) 725 are communicatively coupled with the transceiver(s) 720. Aspects of the dual modem configuration 400, as described with respect to FIG. 4, are also be implemented in STA 110-c.

The processor 705 is an intelligent hardware device, such as a central processing unit (CPU), a microcontroller, an application-specific integrated circuit (ASIC), etc. The processor 705 processes information received through the transceiver(s) 720 and information to be sent to the transceiver(s) 720 for transmission through the antenna(s) 725.

The memory 710 stores computer-readable, computer-executable software (SW) code 715 containing instructions that, when executed, cause the processor 705 or another one of the components of the STA 110-c to perform various functions described herein, for example, triggering a roaming scan and determining whether to roam to a different channel.

The transceiver(s) 720 communicate bi-directionally with other wireless devices, such as APs 105, base station 150, STAs 110, or other devices. The transceiver(s) 720 include modem, such as WWAN modem 439 and WLAN modem 409 as described in FIG. 4, to modulate packets and frames and provide the modulated packets to the antenna(s) 725 for transmission. The modems are additionally used to demodulate packets received from the antenna(s) 725.

The transmission timing identifier 730, filter selector 735, spatial filter(s) 740, channel monitor 745, and weight generator 750 implement the features described with reference to FIGS. 1-6, as further explained below.

Again, FIG. 7A shows only one possible implementation of a device executing the features of FIGS. 1-6 While the components of FIG. 7A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 7A may be implemented by a single, consolidated hardware block. For example, a single transceiver 720 chip may implement the processor 705, memory 710, transmission timing identifier 730, filter selector 735, spatial filter(s) 740, channel monitor 745, and weight generator 750.

Figure 7B:
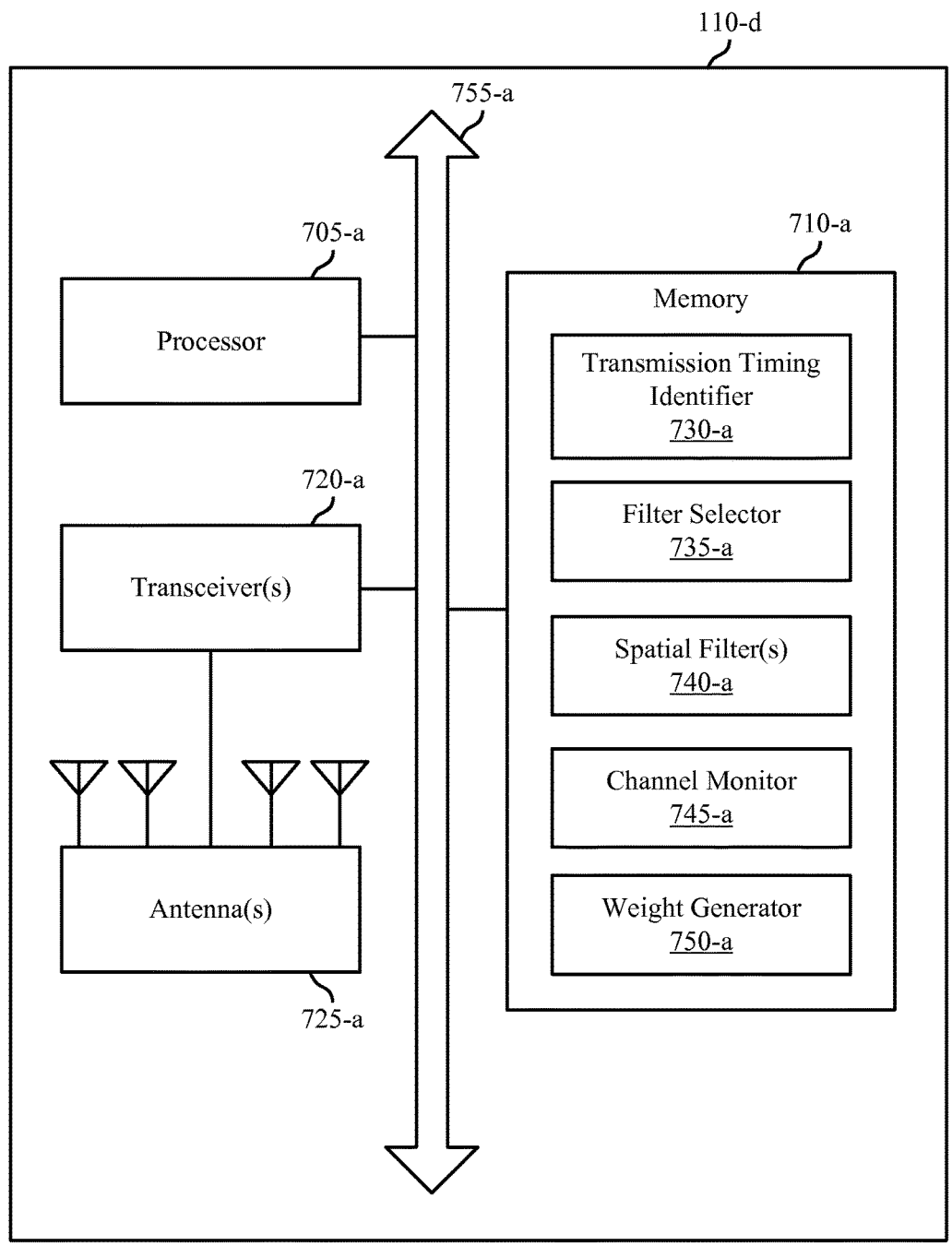

In still other examples, the features of each component may also be implemented, in whole or in part, with instructions embodied in a memory, formatted to be executed by one or more general or application-specific processors. For example, FIG. 7B shows a block diagram 700-b of another example of a STA 110-d in which the features of the transmission timing identifier 730-a, filter selector 735-a, spatial filter(s) 740-a, channel monitor 745-a, and weight generator 750-a are implemented as computer-readable code stored on memory 710-a and executed by one or more processors 705-a. Other combinations of hardware/software may be used to perform the features of one or more of the components of FIGS. 7A and 7B.

Figure 8:
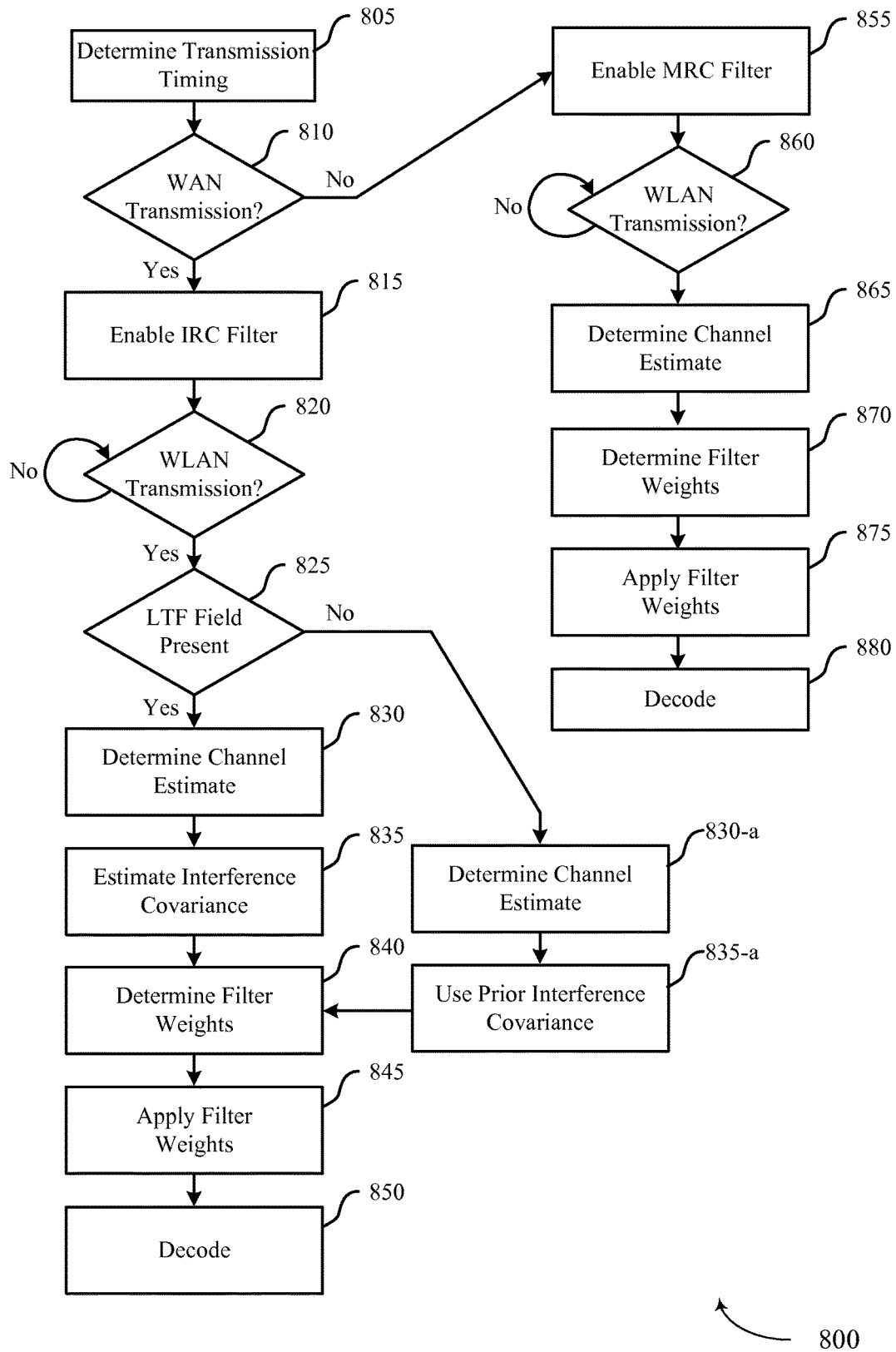
FIG. 8 shows a flow chart that illustrates one example of a method for wireless communication, in accordance with various aspects of the present disclosure.

FIG. 8 shows a flow chart that illustrates one example of a method 800 for wireless communication, in accordance with various aspects of the present disclosure. The method 800 can be performed by any of the STAs 110 discussed in the present disclosure, but for clarity the method 800 will be described from the perspective of STA 110-c and STA 110-d, of FIGS. 7A and 7B. Aspects of the transmission timing identifier 730, filter selector 735, spatial filter(s) 740, channel monitor 745, and weight generator 750 described in FIGS. 7A and 7B may be incorporated into one or both of a WWAN modem and a WLAN modem.

Broadly speaking, the method 800 illustrates a procedure by which a WLAN modem at either STA 110-d or STA 110-k, determines a timing of an interfering transmission (e.g., a WWAN transmission) by a first modem (e.g., a WWAN modem) that operates according to a first RAT (e.g., LTE), and toggles a use of IRC during receive operation of a second modem (e.g., WLAN) that operates according to a second RAT (e.g., Wi-Fi) wherein the toggling is based at least in part on the determine timing of the interfering transmission. The procedure may be broadly applied to other scenarios where the modems are associated with other RATs (e.g., LTE, WLAN, Bluetooth (BT), global positioning system (GPS), etc.).

The method 800 begins with a WLAN modem at a STA receiving a control signal form a WWAN modem that indicates a WWAN transmission timing. At block 805, the transmission timing identifier 730 determines a timing of an interfering transmission by the WWAN modem. In one example, the WLAN modem receives a control signal from the WWAN modem that indicates the WWAN modem is currently transmitting, and the transmission timing identifier 730 determines that a WWAN transmission is active. In another example, the WWAN modem sends a control signal that includes a start and end time for an upcoming transmission/reception, and the transmission timing identifier 730 determines when a WWAN communication begins and ends. In another example, the WWAN modem sends a control signal that includes scheduling information such as communication periodicity and the transmission timing identifier 730 identifies when a WWAN communication will occur. The scheduling information relates to either uplink or downlink transmissions between the WWAN modem and a base station. In yet another example, the WWAN modem is allocated, by the WWAN network, an interval during for uplink WWAN transmission. The WLAN modem preemptively determines that a WWAN transmission is in progress, however in some examples, the WWAN modem fails to perform a successful CCA. Therefore, the WWAN modem transmits a control signal to the WLAN modem indicating that the CCA has failed and that an WWAN transmission is not active.

At block 810, the channel monitor 745 determines whether an WWAN communication is or is expected to be active. If a WWAN communication is active the filter selector 735 enables IRC filtering, but if the WWAN communication is not the filter selector 735 enables MRC filtering.

At block 815, the filter selector 735 enables a spatial filter 740, such as an IRC filter, based at least in part on determining that an interfering WWAN communication is active at the WWAN modem. At block 820, the channel monitor 745 determines whether a WLAN transmission is currently being received. If no signal is being received the channel monitor 745 continues to monitor the shared channel for a WLAN transmissions. Additionally or alternatively, the filter selector 735 selects a spatial filter 740 based at least in part on determining whether the signal strength of the interference caused by the WWAN communication is greater than a pre-determined threshold.

At block 825, the channel monitor 745 determines whether the overlap between the received WLAN transmission and the WWAN transmission includes an LTF field for channel estimation. If the LTF field is present the channel monitor 745 uses the LTF to determine a channel estimate with the interference present, otherwise the channel monitor 745 determines the channel estimate without interference.

At blocks 830 and 830-*a*, the channel monitor 745 estimates the channel based at least in part on the received LTF. At block 835, the weight generator 750 estimates the interference covariance based at least in part on the determined channel estimate, a received signal, and a known signal transmitted during the LTF. At block 835-*a*, the weight generator 750 estimates the interference covariance based at least in part on prior interference covariance estimates. In some examples, the weight generator 750 uses an averaged interference covariance from multiple previous interference covariance measurements.

At block 840, the weight generator 750 determines filter weights for the IRC receiver based at least in part on the channel estimate and the interference covariance estimated in either block 835 or 835-*a*. In one example, the channel monitor 745 divides the WLAN transmission into subbands and the weight generator 750 estimates the interference covariance over each of the subbands. The weight generator 750 then determines a respective weight vector for each of the subbands using the interference covariance associated with the corresponding subband.

At block 845, spatial filter 740, such as the IRC filter, applies the filter weights to the received WLAN transmission. For the data portion of the WLAN transmission the filter weights are used to generate soft output estimates of the received symbols. At block 850, the WLAN modem de-interleaves, decodes, and applies a cyclic redundancy check to the soft output estimates to determine the transmitted information.

At block 855, filter selector 735 enables a spatial filter 740, such as MRC filter, based at least in part on determining that an interfering WWAN transmission is not active. At block 860, the channel monitor 745 monitors the channel for a WLAN transmission. At block 865, the channel monitor 745 determines a channel estimate based at least in part on receiving a WLAN transmission. At block 870, a weight generator 750 determines filter weights for the received signal based at least in part on the channel estimate. At block 875, spatial filter 740, such as MRC filter, applies the filter weights to the received signal, and at block 880 WLAN modem decodes the received WLAN transmission.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a wireless device, comprising:
   determining a timing of an interfering transmission by a first modem of the wireless device according to a first radio access technology (RAT);
   receiving a control message at a second modem of the wireless device, the control message indicating the determined timing of the interfering transmission; and
   toggling a use of interference rejection combining (IRC) during receive operations of the second modem of the wireless device according to a second RAT, wherein the toggling is based at least in part on the determined timing of the interfering transmission.

2. The method of claim 1, wherein toggling the use of IRC during the receive operations at the second modem comprises:
   using IRC to receive a signal at the second modem during the interfering transmission by the first modem.

3. The method of claim 1, wherein toggling the use of IRC during the receive operations at the second modem is further based at least in part on a signal strength of the interfering transmission.

4. The method of claim 3, wherein toggling the use of IRC during the receive operations of the second modem comprises:
   using IRC to receive a signal at the second modem when the signal strength of the interfering transmission is above a threshold.

5. The method of claim 1, wherein toggling the use of IRC during the receive operations of the second modem comprises:
   using maximal ratio combining (MRC) to receive a signal at the second modem when the first modem is not transmitting the interfering transmission.

6. The method of claim 1, further comprising:
   determining a channel estimate of a signal received by the second modem;
   estimating a covariance of the interfering transmission using the determined channel estimate; and
   determining a weight vector for the IRC using the estimated covariance.

7. The method of claim 6, wherein the covariance of the interfering transmission is estimated based at least in part on a training field of a preamble associated with the signal received by the second modem.

8. The method of claim 6, further comprising:
   dividing a bandwidth of the signal received by the second modem into multiple subbands;
   wherein estimating the covariance of the interfering signal is performed by estimating the covariance over each of the multiple subbands.

9. The method of claim 8, wherein determining the weight vector for the IRC comprises:
   determining a respective weight vector for the IRC for each of the multiple subbands using the estimated covariance for the corresponding subband.

10. A communications device comprising:
    coexisting first and second modems;
    a transmission timing identifier to determine a timing of an interfering transmission by the first modem according to a first radio access technology (RAT);
    a control line between the first modem and the second modem to provide a control signal to the second modem, the control signal indicating the determined timing of the interfering transmission; and
    a filter selector to toggle a use of interference rejection combining (IRC) during receive operations of the second modem according to a second RAT, wherein the toggling is based at least in part on the determined timing of the interfering transmission.

11. The communication device of claim 10, wherein the filter selector to toggle the use of IRC during the receive operations at the second modem is further configured to:
    use IRC to receive a signal at the second modem during the interfering transmission by the first modem.

12. The communication device of claim 10, wherein toggling the use of IRC during the receive operations at the second modem is further based at least in part on a signal strength of the interfering transmission.

13. The communication device of claim 12, wherein the filter selector to toggle the use of IRC during the receive operations at the second modem is further configured to:
    use IRC to receive a signal at the second modem when the signal strength of the interfering transmission is above a threshold.

14. The communication device of claim 10, wherein the filter selector to toggle the use of IRC during the receive operations at the second modem is further configured to:
    use maximal ratio combining (MRC) to receive a signal at the second modem when the first modem is not transmitting the interfering transmission.

15. The communication device of claim 10, further comprising:
- a channel monitor to determine a channel estimate of a signal received by the second modem;
- a weight generator to estimate a covariance of the interfering transmission using the determined channel estimate; and
- determine a weight vector for the IRC using the estimated covariance.

16. The communication device of claim 15, wherein the covariance of the interfering transmission is estimated based at least in part on a training field of a preamble associated with the signal received by the second modem.

17. The communication device of claim 15, further comprising:
- a channel monitor to divide a bandwidth of the signal received by the second modem into multiple subbands;
- wherein estimating the covariance of the interfering signal is performed by estimating the covariance over each of the multiple subbands.

18. The communication device of claim 17, wherein the weight generator to determine the weight vector for the IRC is further configured to:
- determine a respective weight vector for the IRC for each of the multiple subbands using the estimated covariance for the corresponding subband.

19. A non-transitory computer-readable medium storing computer-executable code for wireless communication, the code executable by a processor to:
- determine a timing of an interfering transmission by a first modem of a wireless device according to a first radio access technology (RAT);
- transmit a control signal to a second modem of the wireless device, the control message indicating the determined timing of the interfering transmission; and
- toggle a use of interference rejection combining (IRC) during receive operations of the second modem according to a second RAT, wherein the toggling is based at least in part on the determined timing of the interfering transmission.

20. The non-transitory computer-readable medium of claim 19, wherein the code executable by the processor to toggle the use of IRC during the receive operations at the second modem further comprises code executable by the processor to:
- use IRC to receive a signal at the second modem during the interfering transmission by the first modem.

21. The non-transitory computer-readable medium of claim 19, wherein the toggling is further based at least in part on a signal strength of the interfering transmission.

* * * * *